March 31, 1970  D. R. CANTRELL  3,503,301
APPARATUS AND METHOD FOR CUTTING GEARS
Filed April 4, 1968  4 Sheets-Sheet 1
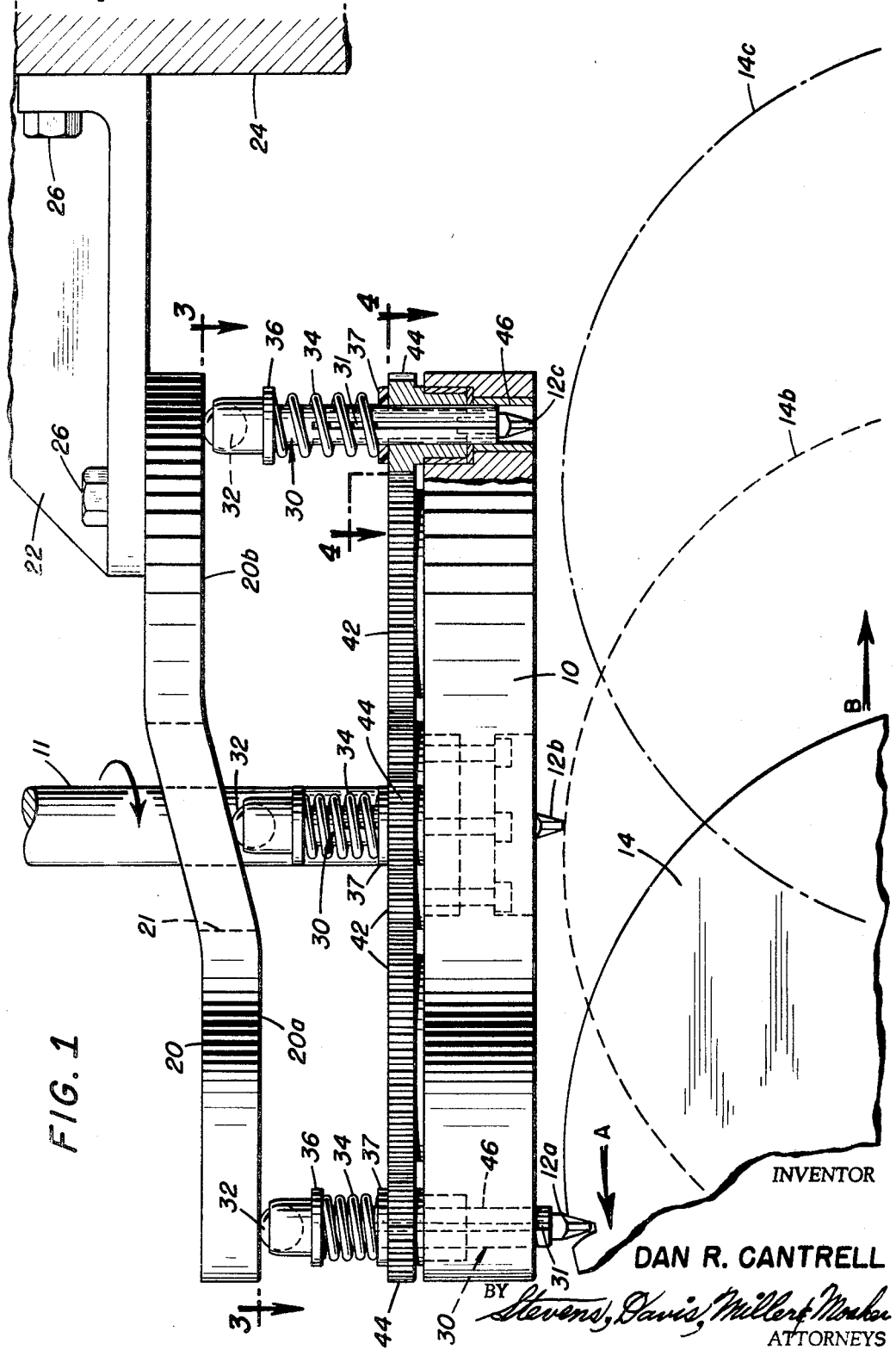
INVENTOR
DAN R. CANTRELL
BY *Stevens, Davis, Miller & Mosher*
ATTORNEYS March 31, 1970     D. R. CANTRELL     3,503,301
APPARATUS AND METHOD FOR CUTTING GEARS
Filed April 4, 1968     4 Sheets-Sheet 2
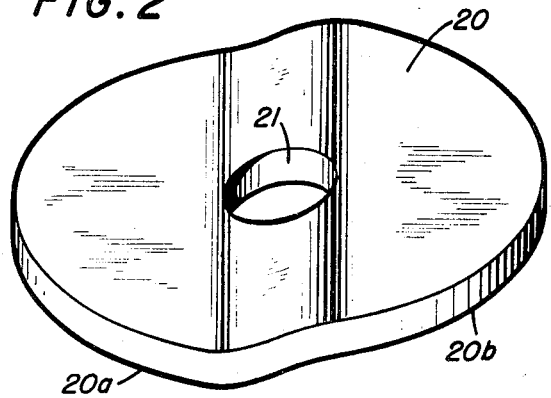
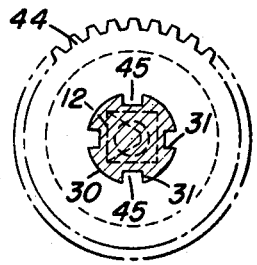
INVENTOR
DAN R. CANTRELL March 31, 1970     D. R. CANTRELL     3,503,301
APPARATUS AND METHOD FOR CUTTING GEARS
Filed April 4, 1968     4 Sheets-Sheet 3
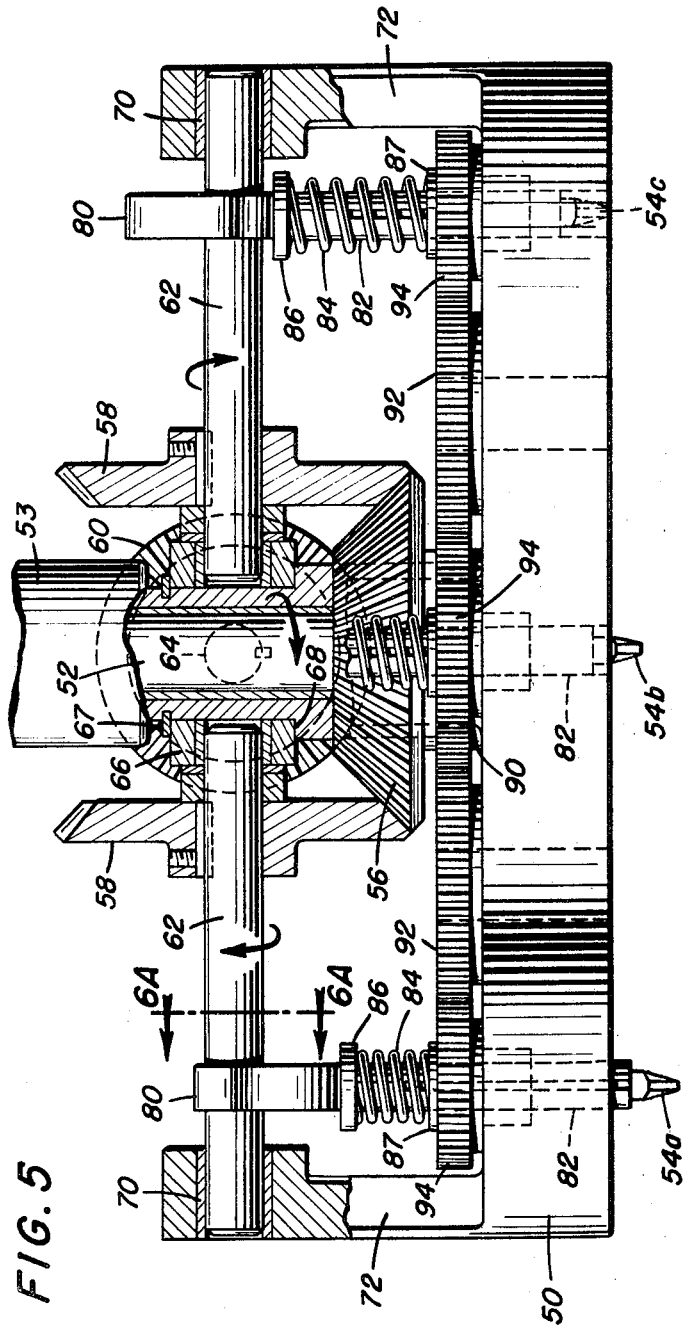
INVENTOR
DAN R. CANTRELL
BY *Stevens, Davis, Miller & Mosher*
ATTORNEYS March 31, 1970     D. R. CANTRELL     3,503,301
APPARATUS AND METHOD FOR CUTTING GEARS
Filed April 4, 1968     4 Sheets-Sheet 4

INVENTOR
DAN R. CANTRELL

United States Patent Office 3,503,301
Patented Mar. 31, 1970

3,503,301
APPARATUS AND METHOD FOR CUTTING GEARS
Dan R. Cantrell, Brookside Apartments, Apt. A, Dickson, Tenn. 37055
Continuation-in-part of application Ser. No. 699,700, Jan. 22, 1968. This application Apr. 4, 1968, Ser. No. 718,813
Int. Cl. B23f *9/10;* B23d *13/06*
U.S. Cl. 90—5    12 Claims

ABSTRACT OF THE DISCLOSURE

An apparatus and method for cutting gears wherein a cutter blade is rotated in a circular path while a gear blank is continuously rotated and translated into a portion of said path. Means are provided to retract the cutter blade into an inoperative position during travel of the cutter blade in the remaining portion of said circular path.

CROSS REFERENCES TO RELATED APPLICATIONS

This application is a continuation-in-part of applicant's U.S. patent application Ser. No. 699,700, filed Jan. 22, 1968.

BACKGROUND OF THE INVENTION

Field of the invention

This invention relates to an apparatus and method for cutting a gear, and more particularly, to an apparatus for continually cutting a radius toothed gear having an involute profile.

According to the present invention, at least one cutter blade is carried by a rotatable support means and normally extends outwardly therefrom while rotating in a generally circular path. Means are provided for continuously axially rotating and translating a gear blank into a portion of said circular path so that the cutter blade generates teeth in said blank, along with means to retract the cutter blade into an inoperative position with respect to the support means during travel of the cutter blade in the remaining portion of said circular path.

Prior art

In applicant's above U.S. application, there is disclosed an arrangement for continually rotating and translating a cylindrical gear blank into the path of at least one cutter blade rotating in an arcuate path about a fixed point. As disclosed, the blade is mounted near the outer periphery of a circular disc which rotates about its axis, the above-mentioned arcuate path being a portion of the circular path through which the blade travels.

It has been discovered that during the movement of the cutter blade in the other arcuate portion of its circular path, or during that portion of the circular path in which the blade is not cutting the teeth, the cutter blade may engage previously cut teeth and either damage them or cause interference, especially when developing gear blanks of a relatively large diameter.

SUMMARY OF THE INVENTION

It is therefore an object of this invention to provide a means for rendering the cutter blade inoperable during that portion of its movement along the circular path in which it is not cutting the teeth.

BRIEF DESCRIPTION OF THE DRAWINGS

Reference is now made to the accompanying drawings for a better understanding of the nature and objects of the present invention, which drawings illustrate the best mode presently contemplated for carrying out the objects of the invention and its principles, and are not to be construed as restrictions or limitations on its scope. In the drawings:

FIG. 1 is a side elevational view partially in section, showing an embodiment of the present invention;

FIG. 2 is a perspective view of the cam utilized in the embodiment of FIG. 1;

FIG. 3 is a cross-sectional view taken along line 3—3 of FIG. 1, showing a plan of the cutter disc;

FIG. 4 is a cross-sectional view taken along line 4—4 of FIG. 1;

FIG. 5 is a side elevational view, partially in section, showing an alternate embodiment of the present invention;

FIG. 6A is a cross-sectional view taken along line 6A—6A of FIG. 5;

FIG. 6B shows a modified cam similar to FIG. 6A;

DESCRIPTION OF THE PREFERRED EMBODIMENTS

Figure 7:
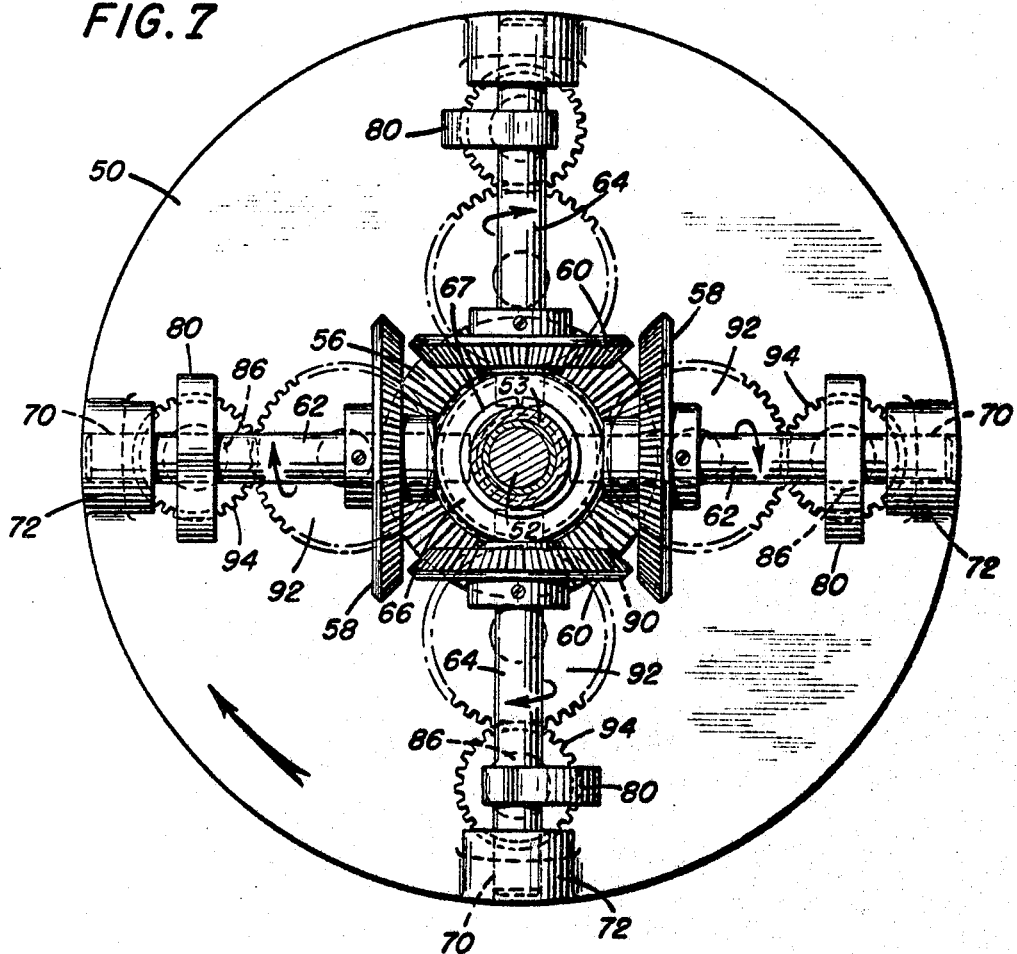
FIG. 7 is a plan view of the embodiment of FIG. 5.
Figure 8:
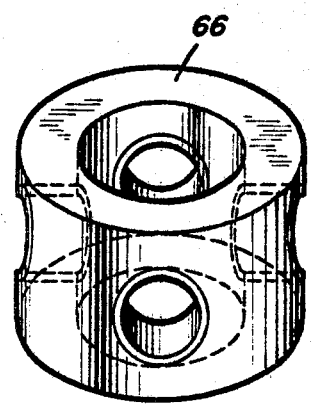
FIG. 8 is a perspective view of the collar that holds the inner ends of the cam shafts shown in FIGS. 5 and 7.

Referring specifically to the drawings, in FIG. 1 the reference numeral 10 refers to a cutter disc which, by means of a power shaft 11, is rotated about its center line. Four equally spaced cutter blades are reciprocally and rotatably mounted on disc 10 near the outer periphery thereof, only three of the blades 12*a*, 12*b* and 12*c* being shown in FIG. 1, it being understood that a fourth blade is directly behind blade 12*b*.

A gear blank 14 is continuously rotated in the direction indicated by arrow A of FIG. 1 and translated in the direction indicated by the arrow B, by means not shown in the drawings, but disclosed in applicant's above-mentioned application.

Also as disclosed in applicant's above-mentioned application, a gearing system may be provided to maintain the leading face of each cutter blade 12 perpendicular to the axis of the gear blank during all movements of the cutting blades with respect to the gear blank, such a gearing system being shown in FIG. 3. In general, this system consists of a gear 40 which is secured to an external member, not shown, so that it is stationary with respect to circular disc 10. Gear 40 engages with idler gears 42 rotatably mounted on circular disc 10, which idler gears, in turn, engage with chuck gears 44. The cutter blades 12 are mounted on chuck gears 44 to rotate therewith. Thus, during rotation of the disc 10, the engagement of stationary gear 40 with the idler gears 42 causes the latter to rotate the chuck gear 44 and cutter blades 12 relative to disc 10 so that the leading faces of the cutter blades maintain a perpendicular orientation with respect to the axis of the gear blank, in all positions of the blades along their circular path of travel.

From a study of FIG. 1, it is apparent that upon rotation of circular disc 10 in conjunction with corresponding continual rotation and translation of gear blank 14, the cutter blades 12 will sweep in a circular path and, upon engaging the gear blank during the "forward" or cutting portion of their stroke, or during that portion shown to the left side of FIG. 1, they will cut a radius tooth gear having an involute profile. Also, during the "rearward" or non-cutting portion of their stroke, or during that portion shown to the right of FIG. 1, the blades must be retracted into an inoperative position to prevent possible damage or interference to the portion of the gear blank that has already been cut, particularly when a gear blank of a relatively large diameter is used.

Taking the situation of FIG. 1, for example, it is seen that as cutter blade 12*a* sweeps along an arcuate path in engagement with the gear blank during its forward or cutting stroke as shown, it becomes necessary, as the gear blank moves to positions shown by the dotted lines 14b and 14c, to retract all or a portion of the remaining blades, such as 12b and 12c, during their rearward or non-cutting stroke along a corresponding arcuate path.

To effect this retraction of the cutter blades, a cam 20 is provided which is shown in FIGS. 1 and 2. In FIG. 1 the cam is shown fixed in a position immediately above the circular disc 10 by means of a bracket 22 attached to a fixed member 24 by means of screws 26 or the like, the cam 20 being provided with a hole 21 through which power shaft 11 extends.

A cam follower is associated with each cutter blade 12 and is in the form of a post 30 secured at one end to a cutter blade 12 by means of a press fit or the like, and engaging cam 20 at the other end, by means of a ball bearing 32. The posts 30 are keyed to chuck gears 44 for slidable movement with respect thereto by means of longitudinal key ways 31 formed in posts 30 cooperating with integral splines 45 formed on the internal bore of chuck gears 44, as seen in FIG. 4. The post and gear assemblies are mounted in suitable holes 46 formed in disc 10, and posts 30 are spring loaded by means of a spring 34 which surrounds each post 30 and extends between a flange 36 formed on each post and an anti-friction washer 37 which bears on associated gear 44.

Therefore, as the circular disc 10 rotates, cutter blades 12 are forced down into engagement with the gear blank during their forward or cutting stroke by means of the engagement of the lower portion 20a of cam 20, or that portion shown to the left of FIG. 1, with ball bearing 32. However, on their rearward or non-cutting stroke, the cutter blades are retracted within holes 46, due to ball bearings 32 and their corresponding posts 30 being forced upwardly against surface 20b of cam 20 by springs 34, as shown by cutter 12c to the right of FIG. 1. Thus, an effective control of the vertical position of each cutter blade is achieved, as it moves along its circular path, and as it rotates with respect to disc 10.

Of course, in the event a different number of cutter blades is desired, a corresponding number of cam followers and gearing means would be used.

Another embodiment for effecting the automatic retraction of the cutter blades is shown in FIGS. 5-8. Specifically, in FIG. 5 a cutter disc 50 is shown which is similar to that shown in the embodiments of FIGS. 1-4, and which is rotated by a power shaft 52. Also, as in the previous embodiment, a plurality of cutter blades 54 extend from the bottom portion of the circular disc 50, and a gearing system may be provided to maintain the leading face of each cutter blade 54 perpendicular to the axis of the gear blank during rotation of the circular disc, this gearing system consisting of a center stationary gear 90 fixed with respect to the disc, a plurality of idler gears 92, and a plurality of chuck gears 94, said gears being arranged similarly to the previous embodiment.

A stationary bevel gear 56 is fixedly mounted with respect to a stationary member 53 of the machine frame, and has a center hole therein through which the power shaft 52 extends, so that the latter can be secured to disc 50 and rotate with respect to gears 56 and 90.

Two sets of bevel gears are in engagement with stationary bevel gear 56 as shown in FIGS. 5 and 7. Specifically, a pair of bevel gears 58 engage the stationary bevel gear 56 adjacent the outer edge thereof, where the mean pitch diameters of the former are the same as that of the latter; and a pair of bevel gears 60, which are smaller than gears 58, engage the stationary bevel gear 56 nearer its center than the corresponding engagement of bevel gears 58, also so that the mean pitch diameters of gears 60 are the same as that of gear 56. Therefore, due to the sizes of bevel gears 58 and 60 and their relative positioning on stationary level gear 56, there is a ratio of 1:1 between the stationary bevel gear 56 and the four bevel gears 58 and 60.

A cam shaft 62 extends from each of the large bevel gears 58 and a cam shaft 64 extends from each of small bevel gears 60, as shown. One end of each cam shaft 62 extends within a hole provided in a rotating collar 66, shown in perspective in FIG. 8, and the other end thereof engages in bearing 70 formed in a bracket 72 integral with the cutter disc 50 at the outer periphery thereof, it being understood that cam shafts 64 are mounted in a similar manner. The rotating collar 66 is secured against movement with respect to the axis of power shaft 52 by retaining snap ring 67 and shoulder 68 of stationary member 53.

Due to the connection between the cam shafts 62 and 64 with the disc 50 through brackets 72, collar 66 rotates with disc 50 with respect to stationary member 53 and gears 56 and 90, causing bevel gears 58, 60 to travel around stationary gear 56, thus imparting rotation to shafts 62, 64 and cams 80. Due to the above-described 1:1 ratio, the cam shafts 62 and 64 will turn one complete revolution for one complete revolution of the disc 50.

An eccentric cam 80 is mounted near the end of each cam shaft directly over the center of each chuck gear 94. A cam follower is provided for each of the cams 80 and consists of a post 82 engaging cam 80 at one end thereof and holding a cutter blade 54 at the other end. Each post 82 is mounted for slidable movement with respect to its associated chuck gear 94 and each gear and post assembly is suitably mounted in a hold formed in circular disc 50 as in the previous embodiment. A spring 84 is provided which surrounds each post 82, which engages a flange 86 formed on the cam-engaging end of each post, and which bears against an anti-friction washer 87 on each chuck gear 94, so that each cutter blade 54 is normally urged upwardly into a retracted position within circular disc 50.

Therefore, during the forward or cutting stroke of each cutter blade 54, as shown, for example, by blade 54a in FIG. 5, the eccentric cam 80 urges the cutter blade through means of its corresponding cam follower, down into an operative position against the force of spring 84 whereby it cuts the gear blank. During this movement, the remaining cutter blades, such as 54b and 54c are retracted within circular disc 50 due to the action of their associated cam followers 82 on cams 80 in response to the force of springs 84.

The cams 80 can take any known shape as long as they effect the above movement of the associated followers. For example, the cams 80 can be shaped as shown in FIG. 6A wherein they have a generally elliptical contour with an angle intercepted by a circular arc of approximately 180°. An alternate configuration is shown by cam 80' in FIG. 6B, where the angle intercepted by the circular arc is 120°, the cam otherwise having a similar configuration to that shown in FIG. 6A. Other circular arc lengths may be used—the length being chosen according to the required cutting stroke of cutter blades 54, and the point at which they must be retracted.

It is understood that the entire mechanism extending above the cutter disc can be enclosed and provided with a lubrication system.

Of course, variations of the specific construction and arrangement of the embodiments of the present invention disclosed above can be made by those skilled in the art without departing from the invention.

I claim:

1. Apparatus for cutting a radius tooth gear from a gear blank, said apparatus comprising supporting means rotatable about a fixed point, at least one cutter blade carried by said support means normally extending outward therefrom and rotatable therewith in a generally arcuate path about said fixed point and rotatable relative to said support means, means for continuously axially translating and rotating said gear blank into a portion of said arcuate path so that said cutter blade generates teeth in said blank, and means imparting relative rotary motion between said blade and said support means to maintain the leading face of said cutter blade at a predetermined constant angle relative to the axis of said gear blank during said movement of said gear blank, and means to retract said cutter blade into an inoperative position with respect to said support means during travel of said cutter blade in the remaining portion of said arcuate path.

2. The apparatus of claim 1 in which the support means is a disc, and a plurality of said cutter blades are mounted on said disc for rotation relative thereto and for travel with said disc in a circular path.

3. The apparatus of claim 1 wherein said predetermined constant angle is substantially 90°.

4. The apparatus of claim 1, wherein said means to maintain the leading face of said cutter blade at a predetermined constant angle relative to the axis of said gear blank comprises a first non-rotatable gear carried by said disc and concentric with respect to said fixed point, at least one idler gear rotatably mounted on said disc and engaging said non-rotatable gear and at least one chuck gear rotatably mounted on said disc, said cutter blade being fixedly engaged by said chuck gear.

5. The apparatus of claim 1, wherein said means to retract said cutter blade comprises at least one cam carried by said support means, a cam follower engaging said cam and said cutter blade and resilient means to urge said cutter blade, through said follower, against said cam, said cam being shaped to cam said cutter blade, through said follower, against the force of said resilient means into a cutting position during movement of said cutter blade in said first portion of said circular path, and to permit said cutter blade to retract into said inoperative position through said follower by the force of said resilient means during movement of said blade in said remaining portion of said circular path.

6. The apparatus of claim 5, wherein said follower is fixed to said cutter blade and wherein said follower and said cutter blade are slidably movable with respect to said support means.

7. The apparatus of claim 5, wherein said resilient means comprises a spring engaging said cam follower.

8. The apparatus of claim 5, wherein said cam is in the form of a substantially circular disc fixed with respect to said support.

9. The apparatus of claim 5, further comprising at least one cam shaft carried by said support means, and means to rotate said cam shaft in response to rotation of said support means, at least one cam being eccentrically mounted on said cam shaft.

10. The apparatus of claim 9 wherein said means to rotate said cam shaft comprises a stationary bevel gear, and a rotatable bevel gear connected to each cam shaft, engaging said stationary bevel gear, and rotatable in response to rotation of said support means.

11. A method of cutting a radius tooth gear from a gear blank, comprising the steps of rotating a cutter blade in a generally arcuate path about a fixed point, and imparting a continuously axially translatory and rotary movement to said gear blank into a portion of said path, so that said cutter blade generates teeth in said blank, imparting rotary motion to said cutter blade relative to said path to maintain the leading face of said cutter blade at a predetermined constant angle to the axis of said gear blank, and retracting said cutter blade from its cutting position during its travel in the remaining portion of said arcuate path.

12. The method of claim 11 wherein said predetermined constant angle is maintained at substantially 90°.

References Cited

UNITED STATES PATENTS

| 1,266,839 | 5/1918 | Maag | 90—55 X |
| 1,355,919 | 10/1920 | Schurr | 90—5 |
| 1,364,056 | 12/1920 | Farnum | 90—5 |
| 1,893,943 | 1/1933 | Johanson | 90—55 |

GIL WEIDENFELD, Primary Examiner

U.S. Cl. X.R.
90—55